Aug. 17, 1954

M. ROCK 2,686,608

GREASE GUARD

Filed Aug. 22, 1950

Inventor
Murray Rock

Tom Walker
Attorney

Patented Aug. 17, 1954

2,686,608

UNITED STATES PATENT OFFICE 2,686,608

GREASE GUARD

Murray Rock, Dayton, Ohio

Application August 22, 1950, Serial No. 180,866

1 Claim. (Cl. 220—4)

This invention relates to guards as mounted on skillets and the like to intercept and deflect spattering grease particles.

Grease guards of the kind described have heretofore been known, but in the form of attachments which are made of metal and kept on hand for repeated use, it being necessary of course to clean the attachment after each use.

An object of the instant invention is to obviate the disadvantages of grease guards of the prior art, it being contemplated to provide a simple and inexpensive guard made of paper or the like and which may be discarded after one or two occasions of use.

Another object of the invention is to make the grease guard adjustable to a wide range of skillet sizes.

A further object of the invention is to provide for a draft of cool air through the guard to assist in repelling escape of the grease particles.

Still another object of the invention is to supply the grease guards in a flat, easy to store, form from which they may be readily and quickly prepared for use without the exercise of any special skill.

A still further object of the invention is to utilize the sloping side wall usually found in skillets as a seat for the grease guard, the guard being installed simply by dropping it into the skillet where it is supported in spaced relation to the bottom thereof. It is, therefore, a still further object of the invention to avoid deterioration and damage likely to result were the grease guard allowed to rest on the bottom of the skillet.

Still another object is to provide for home and commercial use, a clean, sanitary grease guard of the kind described which is cheap and disposable and which accordingly may be renewed as frequently as desired at but slight expense.

A further object of the invention is to provide a grease guard having the advantageous structural features, the meritorious characteristics and the mode of use herein set forth.

With the above primary and other incidental objects in view as will more fully appear in the specification, the invention intended to be protected by Letters Patent consists of the features of construction, the parts and combinations thereof, and the mode of operation, as hereinafter described or illustrated in the accompanying drawings, or their equivalents.

In the drawing, wherein is shown the preferred but obviously not necessarily the only form of embodiment of the invention;

Like parts are indicated by similar characters of reference throughout the several views.

Figure 2:
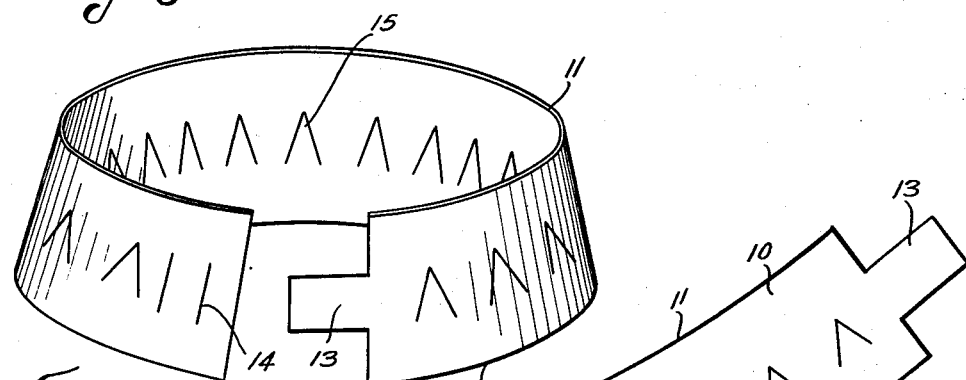
Fig. 2 is a view of the guard indicating the manner in which it is prepared for use.
Figure 1:
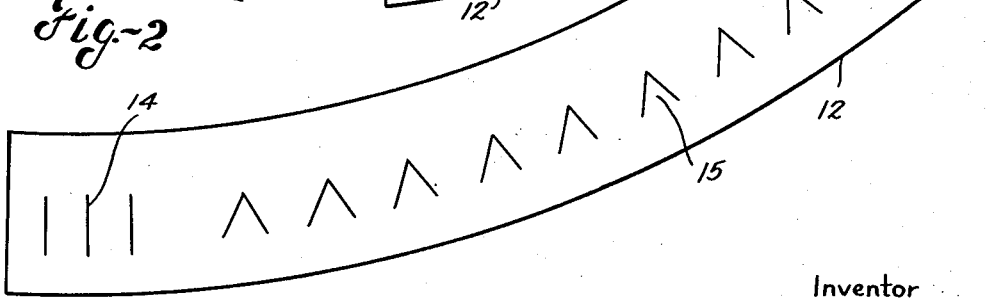
Fig. 1 is a view of the grease guard in knocked down or unassembled condition.

Referring to the drawings, there is shown in Fig. 1 a device in accordance with the present invention as cut and shaped for forming a grease guard. A strip 10 of flexible fire resistant material, preferably for example, chemically treated paper, is used. The paper strip is arcuate in shape, presenting relatively short and long side edges 11 and 12. On one end of the strip is a projecting tongue 13 while in the other end are spaced apart slits 14. It will be understood that the tongue 13 is received in one or another of the slits 14, in accordance with the desired diameter of the device, as suggested in Fig. 2. Upon assembly there is thus formed a ring-like member having the shape of a truncated cone, the side edge 12 of the strip 10 becoming the base of such member and the side edge 11 becoming the frustrum thereof.

The strip 10 is further cut and formed with a series of triangular flaps 15, the series of flaps extending longitudinally of the strip and being offset toward the base 12. Further, the individual flaps 15 are arranged with their bases facing and parallel to the base 12 and with their apices extending toward the frustrum 11.

Figure 4:
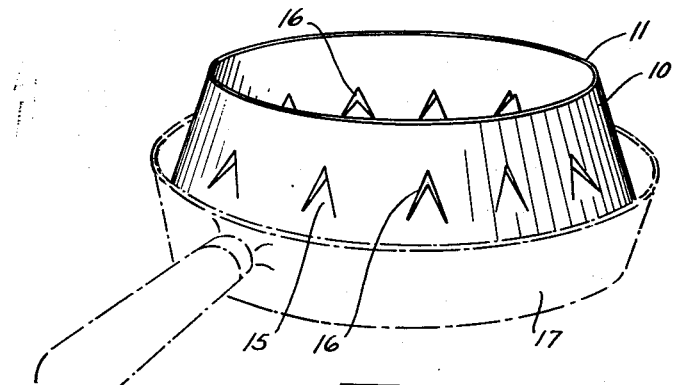
Fig. 4 is a view in perspective of the guard installed in a skillet.
Figure 3:
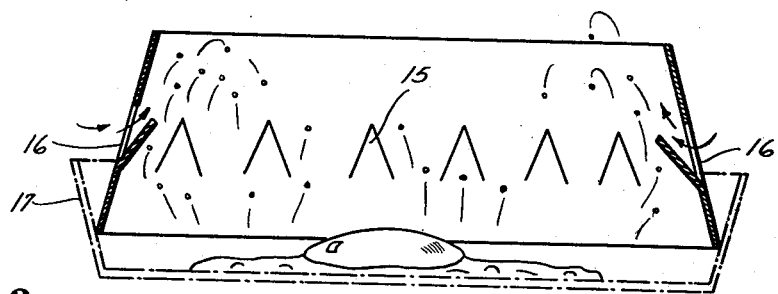
Fig. 3 is a view of the guard in cross section installed in a skillet.

When the guard device has been assembled, the flaps 15 are pressed inward thereby forming a series of radial vents 16. In use, the device is dropped into a skillet 17 with the base 12 facing downward—as shown in Figs. 3 and 4. The diameter of the device is pre-adjusted with regard to the skillet with which it is to be used, in such way that the guard is received in the skillet but with the base 12 resting on the flaring side wall thereof and not on the bottom. Extending as a cone from a point adjacent the bottom of the skillet to a point above the side wall thereof, the guard device intercepts angularly spattering grease and absorbs or returns it to the bottom of the skillet. The vents 16 are positioned to lie above the skillet in the installed position of the guard device. As so located, they admit a draft of relatively cool air, which, in flowing into the guard device, through the side thereof, and out through the open top, assists in repelling the escape of grease particles over the top edge of the device.

Being made simply and inexpensively out of ordinary paper or like material, the guard device is essentially disposable. While it is ordinarily capable of re-use, if desired, its useful life is dependent upon conditions of use.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect.

Having thus described my invention, I claim:

A disposable grease guard for skillets and the like formed from a strip of fire resistant paper cut in a substantially arcuate shape, a tongue and slit formation on the opposite ends of said strip whereby said ends may be interengaged to define a ring-like member having the shape of a truncated cone, a longitudinal series of triangular flaps cut in said strip of paper defining cool air vents, said series of flaps being spaced from the base of the strip of paper, the apex of the flaps pointing upwardly from the base and inwardly from the inside wall of the strip of paper toward the frustrum of the member, when the ends of the grease guard are interengaged in operable position.

References Cited in the file of this patent

UNITED STATES PATENTS

| Number | Name | Date |
|---|---|---|
| 497,162 | Backman | May 9, 1893 |
| 740,723 | Wheeler | Oct. 6, 1903 |
| 1,879,950 | Read, Jr. | Sept. 27, 1932 |
| 2,004,098 | Andrews | June 11, 1935 |
| 2,198,158 | Fletcher | Apr. 23, 1940 |
| 2,225,389 | Osterdahl | Dec. 17, 1940 |
| 2,291,753 | Patten | Aug. 4, 1942 |